U. S. WOLF.
Wicker Basket.
No. 165,047.  Patented June 29, 1875.
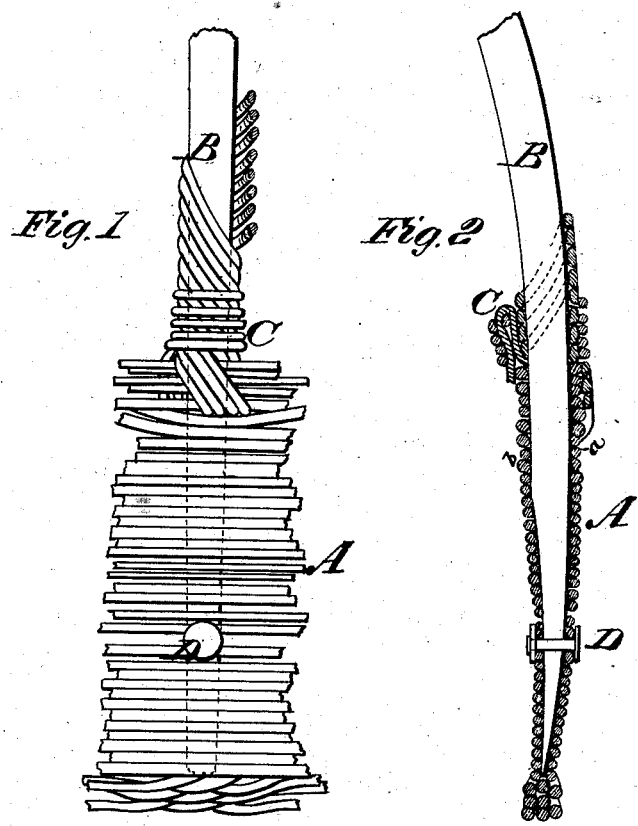
WITNESSES
Robert Everitt
E H Bates
INVENTOR
U. S. Wolf
Chipman Hosmer & Co,
Attorneys

UNITED STATES PATENT OFFICE.

UFFORD S. WOLF, OF OTTO, INDIANA.

IMPROVEMENT IN WICKER-BASKETS.

Specification forming part of Letters Patent No. 165,047, dated June 29, 1875; application filed September 19, 1874.

*To all whom it may concern:*

Be it known that I, UFFORD S. WOLF, of Otto, in the county of Clarke and State of Indiana, have invented a new and valuable Improvement in Wicker-Baskets; and I do hereby declare that the following is a full, clear, and exact description of the construction and operation of the same, reference being had to the annexed drawings, making a part of this specification, and to the letters and figures of reference marked thereon.

Figure 1 is a side view of the handle and a portion of the body of the basket, showing the means of attaching the handle to the basket. Fig. 2 is a vertical view of the same.

The object of this invention is to improve wicker-baskets so that their handles will not be liable to break away from their bodies; and the nature of my invention consists in rigidly securing the inserted ends of the bail or handle to the body of the basket, near the bottom thereof, by means of broad-headed rivets, in such manner that the heads of such rivets will firmly clamp and hold the willows both inside and outside of the basket, as will be more fully understood from the following description.

In the annexed drawings, A designates part of the body of a wicker-basket, having exterior and interior walls $a$ and $b$; B, the bail or handle thereof, and C the willow wrapping by which the handle is secured to the upper edge of the basket.

Owing to the peculiar construction of wicker-baskets this wrapping C can only include four or five of the willows forming the upper edge or rim, as shown in Fig. 1; consequently the handles are not securely fastened to the bodies of the baskets, and they give way long before the bodies have worn out.

To obviate the objection named I employ rivets D in the following manner: Insert a rivet having a broad head through a hole made in the lower end of the basket-handle and basket, and apply a washer on its end, and firmly clinch it, so that the head of this rivet, and also the washer, will firmly bind the adjacent willows to the handle, as shown in Fig. 2.

The rivets prevent undue strain on the wrapping C, and, indeed, they would securely hold the handle without the wrapping.

For very large baskets more than one rivet on each side may be used.

The handle B is inserted between the willows or twigs which constitute the body of the basket, as clearly shown in Fig. 2.

I am aware that handles have heretofore been secured between the willows and the fastenings thereof, near the top of the basket, by means of wooden pins passing longitudinally through the handle; and I therefore lay no claim to such invention.

What I claim as new, and desire to secure by Letter Patent, is—

The wicker-basket A, having exterior and interior sides $a$ and $b$ tapering to its bottom, in combination with the handle B, wedge-shaped at both ends, and inserted between the walls $a$ $b$, and extending to the bottom of the basket, rivets D, applied near the bottom of the basket with overlapping washers, and willow wrapping C, substantially as and for the purpose set forth.

In testimony that I claim the above, I have hereunto subscribed my name in the presence of two witnesses.

UFFORD S. WOLF.

Witnesses:
HIRAM P. DEAN,
ROBERT B. HAMILTON.